United States Patent
Kondoh et al.

(10) Patent No.: US 7,356,649 B2
(45) Date of Patent: Apr. 8, 2008

(54) SEMICONDUCTOR DATA PROCESSOR

(75) Inventors: Yuki Kondoh, Kokubunji (JP); Tatsuya Kamei, Kokubunji (JP); Makoto Ishikawa, Kokubunji (JP)

(73) Assignee: Renesas Technology Corp., Tokyo (JP)

( * ) Notice: Subject to any disclaimer, the term of this patent is extended or adjusted under 35 U.S.C. 154(b) by 259 days.

(21) Appl. No.: 10/520,653

(22) PCT Filed: Sep. 30, 2002

(86) PCT No.: PCT/JP02/10162

§ 371 (c)(1),
(2), (4) Date: Jan. 10, 2005

(87) PCT Pub. No.: WO2004/031963

PCT Pub. Date: Apr. 15, 2004

(65) Prior Publication Data

US 2005/0257011 A1    Nov. 17, 2005

(51) Int. Cl.
*G06F 12/00* (2006.01)
(52) U.S. Cl. ...................................... 711/138; 711/170
(58) Field of Classification Search ................. 711/138
See application file for complete search history.

(56) References Cited

U.S. PATENT DOCUMENTS

| | | | | |
|---|---|---|---|---|
| 5,410,669 A | 4/1995 | Biggs et al. | ............ | 395/425 |
| 5,432,943 A | 7/1995 | Mitsuishi | ............ | 395/725 |
| 5,701,425 A | 12/1997 | Nakahara | ............ | 395/376 |
| 6,134,641 A * | 10/2000 | Anand | ............ | 711/202 |
| 6,678,790 B1 * | 1/2004 | Kumar | ............ | 711/118 |
| 2002/0029322 A1 * | 3/2002 | Koga | ............ | 711/125 |

FOREIGN PATENT DOCUMENTS

| | | |
|---|---|---|
| JP | 1-142844 | 6/1989 |
| JP | 5-307485 | 11/1993 |
| JP | 6-103064 | 4/1994 |
| JP | 6-309216 | 11/1994 |
| JP | 6-348593 | 12/1994 |
| JP | 2000-148584 A | 5/2000 |
| JP | 2001-256108 | 9/2001 |
| JP | 2001-282616 | 10/2001 |

* cited by examiner

*Primary Examiner*—Reginald Bragdon
*Assistant Examiner*—Eric S Cardwell
(74) *Attorney, Agent, or Firm*—Miles & Stockbridge P.C.

(57) ABSTRACT

A semiconductor data processor has a first memory(6) constituting a cache memory, a second memory(20) capable of being a cacheable area or a non-cacheable area by the first memory, and a read buffer(12) capable of carrying out an operation for outputting data corresponding to a read access when the second memory is read accessed as the non-cacheable area. The designation of the cacheable area and the non-cacheable area for the second memory is determined by the designation of a cacheable area or a non-cacheable area for a memory space to which the second memory is mapped. The designation may be carried out in the operation mode of the data processor or by setting a control register, for example.

11 Claims, 4 Drawing Sheets

SEMICONDUCTOR DATA PROCESSOR

FIELD OF THE INVENTION

The present invention relates to the access control of a data processor having an on-chip memory, particularly, the on-chip memory, and to a technique which is effectively applied to the microcomputer of a single chip, for example.

BACKGROUND OF THE INVENTION

In a data processor, a high speed memory has been built in to enhance a performance. For example, a high speed memory having a built-in data processor is provided in the address space of a CPU (central processing unit) in the same manner as an external memory and is thus used. Moreover, the built-in memory is utilized as a cache memory to constitute a cache system, thereby increasing the speed of a memory access. The former example has been disclosed in JP-A-5-307485 publication and the latter case has been disclosed in JP-A-6-103064 publication.

SUMMARY OF THE INVENTION

In the former example, a performance cannot be enhanced even if the memory is simply built in the data processor. It is necessary to previously investigate a memory area to which reference is often made in an operating program and to allocate the same portion to a data processor built-in memory. In short, the way of the address mapping of the built-in memory corresponding to an operating program to be executed by the data processor greatly influences a data processing performance.

In the latter example, moreover, the frequency of the access of the memory area is automatically decided and is stored in a cache memory every memory access from the program. For this reason, it is not necessary to previously investigate the memory area to which reference is often made. However, an access pattern which cannot obtain an enhancement in a performance is present according to an algorithm for deciding the frequency of the access. More specifically, the memory access performance of the cache memory can be enhanced when the same data are accessed plural times. To the contrary, the memory access performance is deteriorated for image data to be sequentially scanned in series in some cases. For example, in a general algorithm, the performance cannot be enhanced in some situations in which a program for sequentially memory accessing (sequential access) a certain memory area from a start address to an end address at each time and a program for randomly accessing (random access) various addresses are artificially executed at the same time by time sharing.

It is an object of the invention to provide a semiconductor data processor which can easily enhance an access performance for a built-in memory.

It is another object of the invention to provide a semiconductor data processor capable of efficiently carrying out a sequential access without deteriorating the performance of a random access for a built-in memory.

It is a further object of the invention to provide a semiconductor data processor capable of easily enhancing an access performance for both a sequential access and a random access for a built-in memory.

The above and other objects and novel features of the invention will be apparent from the following description of this specification and the accompanying drawings.

[1] A semiconductor data processor has a first memory constituting a cache memory, a second memory capable of being a cacheable area or a non-cacheable area by the first memory, and a read buffer capable of carrying out an operation for outputting data corresponding to a read access when the second memory is read accessed as the non-cacheable area. The designation of the cacheable area and the non-cacheable area for the second memory is determined by the designation of a cacheable area or a non-cacheable area for a memory space to which the second memory is mapped. The designation may be carried out in the operation mode of the data processor or by setting a control register, for example.

There is supposed a utilization configuration which is hard to expect the advantages of an increase in the speed of the access by the cache memory as in a sequential access. When the second memory to be the non-cacheable area is to be sequentially accessed, data responding to the sequential access are output from the read buffer so that a sequential read access can be carried out at a high speed. In the sequential access, the cache operation of the first memory is not carried out and cache entry data retained in the first memory can be prevented from being undesirably rewritten or replaced based on sequential access data which have a low possibility of a re-access. Consequently, it is possible to efficiently carry out the sequential access without deteriorating the performance of a random access for a built-in memory.

As a desirable manner of the invention, the read buffer temporarily holds predetermined access data and address when the second memory is accessed as the non-cacheable area. For example, when the second memory is accessed, data and an address corresponding to the access are newly held if the read buffer does not retain the data corresponding to the access. The data thus held are output from the read buffer in place of the read access of the second memory. In short, the read buffer is operated to hold data including the contents of a last memory access and to output the held data in place of the access of the second memory in response to the detection of the access of the same data as the held data if any.

As a desirable manner of the invention, the read buffer is connected to a first bus at an upstream side of a read request and is connected to a second bus at a downstream side of the read request. The second bus can transmit data in the number of parallel bits which is equal to or larger than the number of parallel access data bits by the first bus. The data to be sequentially accessed can be collectively stored in the read buffer via the second bus. The read buffer can output the stored data in response to a read access to the second memory corresponding to some times.

As a desirable manner of the invention, the read buffer has a data register for holding read data to be transmitted from the first memory through the second bus, an address register for holding an address of the data, and a control circuit for causing the first bus to output the data of the data register for a read request of an address which is coincident with the address held in the address register.

As a desirable manner of the invention, the first bus and the second bus are dedicated sequential access buses. Moreover, there is provided a third bus capable of connecting the first memory to the second memory in a different path from a path formed by the first and second buses when the second memory is accessed as the cacheable area. A peripheral bus interface controller is connected to the third bus if any. An interface control for the second bus dedicated for a dedicated sequential access bus is dedicated. Therefore, the interface control is simple and is convenient to a high speed access.

As a desirable manner of the invention, there is provided an internal memory controller connected to the second bus and the third bus and serving to carry out an access interface control for the second memory. Moreover, the third bus is provided with a secondary cache memory controller for controlling the second memory as a secondary cache memory for the first memory. The secondary cache memory controller cache invalidates the second memory in response to a signal indicative of a cache invalidation of the first memory. Information stored in the primary cache and the secondary cache are conveniently matched with each other. According to the utilization configuration for the second memory, it is preferable that the internal memory controller and the secondary cache memory controller should be exclusively operable. This is preferably set by a control register.

[2] A semiconductor data processor has a first memory constituting a cache memory, a second memory capable of being a secondary cache memory or a memory which is not a cache memory for the first memory, and designating means for selectively designating the second memory to the secondary cache memory or the memory which is not the cache memory. The means described above can properly correspond to both the case in which it is desirable that the second memory should be used as the secondary cache memory in respect of a data processing and the case in which it is desirable that the second memory should be used as a memory provided in the address space of a CPU in respect of the data processing. Accordingly, it is easy to enhance an access performance for the second built-in memory corresponding to the data processing configuration of the data processor.

As a desirable manner of the invention, the second memory has a secondary cache memory controller for carrying out an access interface control as the secondary cache memory of the first memory. Moreover, there is provided an internal memory controller for carrying out the access interface control as the memory which is not the cache memory for the second memory. The second memory selected to be the memory which is not the cache memory may be set to be a cacheable area or a non-cacheable area by the first memory. It is also possible to have a read buffer capable of carrying out an operation for outputting data corresponding to the read access of the second memory as the non-cacheable area when performing the same access.

DETAILED DESCRIPTION OF THE PREFERRED EMBODIMENTS

Figure 1:
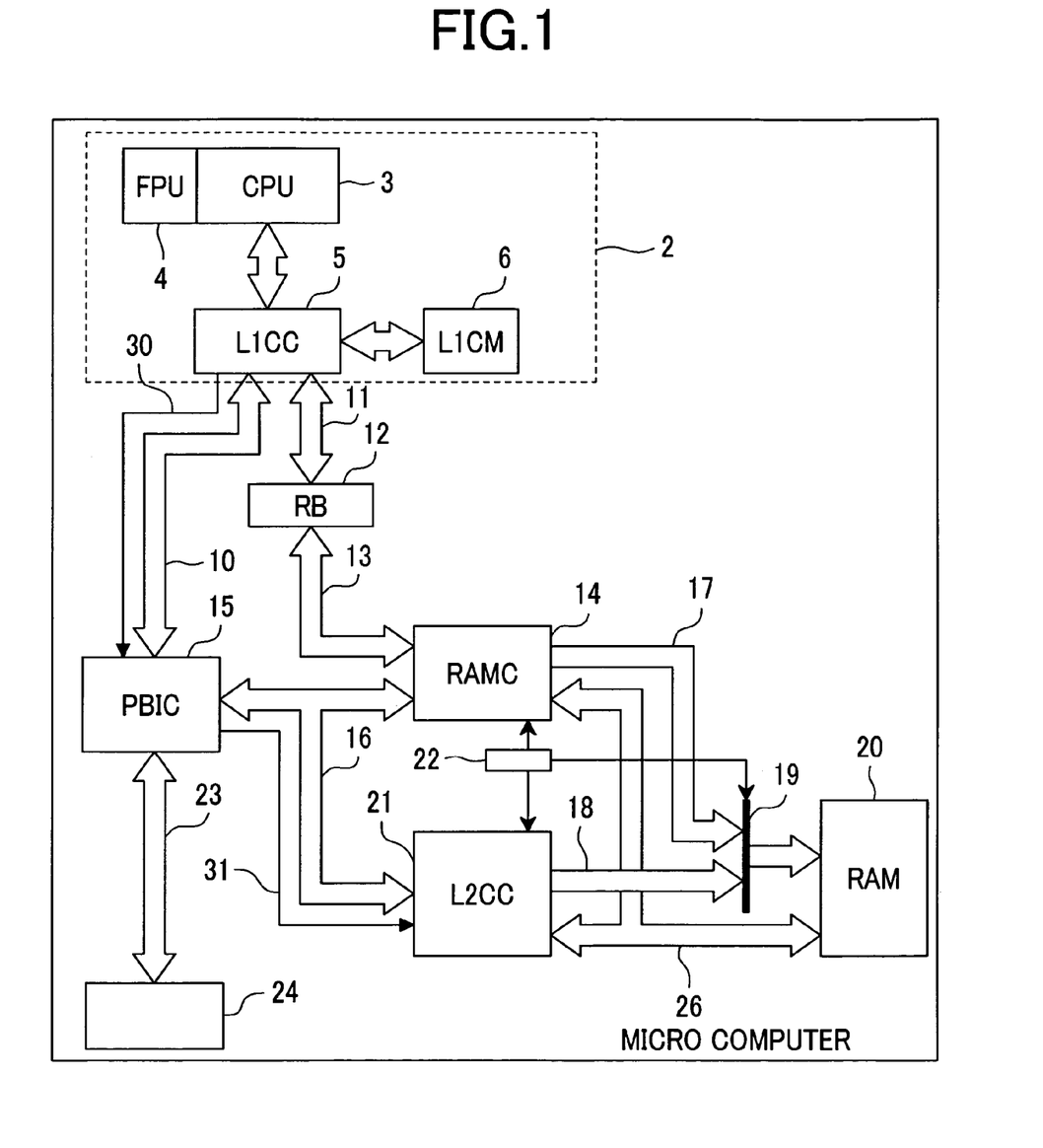
FIG. 1 is a block diagram illustrating a microcomputer according to an example of the invention.

FIG. 1 illustrates a microcomputer according to an example of the invention. A microcomputer 1 shown in FIG. 1 is formed on one semiconductor substrate (semiconductor chip) such as a monocrystalline silicon by a well-known CMOS integrated circuit manufacturing technique.

FIG. 1 typically shows an interface portion between a processor core and a built-in memory. A processor core 2 has a CPU (central processing unit) 3, an FPU (floating-point operation unit) 4, a primary cache memory controller (L1CC) 5, and a primary cache memory (L1CM) 6 to be a first memory, for example. The CPU 3 is constituted by an instruction control portion and an executing portion. The instruction control portion fetches an instruction, decodes the instruction thus fetched, and generates a control signal. The executing portion has a general purpose register and an ALU (Arithmetic Logical Unit), and an operation thereof is generated by the control signal and an operation using a fetched operand is carried out. The FPU 4 is not particularly restricted but receives a floating-point operation command from the CPU 3 when the CPU 3 fetches a floating-point instruction, and the CPU 3 carries out a floating-point operation upon receipt of an accessed operation operand.

The primary cache memory 6 is not particularly restricted but has an associative memory structure in a set associative configuration. The primary cache memory controller 5 associatively searches the primary cache memory 6 when a cacheable area (a cacheable area) is accessed, accesses the primary cache memory 6 when a cache hit is obtained, and gives a memory access to a lower side of an internal memory 20 which will be described below if a cache error is made, and thus fetches necessary data and instructions and controls a cache fill for the primary cache memory 6 and the replacement of a cache entry if necessary. The internal memory 20 is constituted by an SRAM (static random access memory), for example.

As a path to be used in the memory access on the lower side, an interface bus 11 for a sequential access which acts as a first bus and an interface bus 10 for a random access which acts as a third bus are connected to the primary cache memory controller 5. The interface bus 11 for a sequential access is connected to one of the access ports of a read buffer 12 and the other access port of the read buffer 12 is connected to an interface bus 13 to be a second bus. The interface buses 10, 11 and 13 include signal lines for address, data and access control signals. The number of the parallel access data bits of the interface bus 13 is set to be equal to or larger than the number of the parallel access data bits of the interface bus 11. For example, the number of the parallel access data bits of the interface bus 13 is 256 and the number of the parallel access data bits of the interface bus 11 is 64. The number of the parallel access data bits of the interface bus 10 is 64.

The read buffer 12 transmits data retained in the read buffer 12 to the primary cache memory controller 5 when an access request given from the interface bus 11 is read and an access request address is coincident with an address stored in the read buffer 12. When the access request is the read and the addresses are not coincident with each other, the read buffer 12 replaces the data width of the access request, for example, replaces 64 bits with 256 bits to issue an interface request to the interface bus 13. In case of a write access, moreover, the access request transmitted from the interface bus 11 is exactly output as an interface request to the interface bus 13.

The access request given from the interface bus 13 is transmitted to an internal memory controller (RAMC) 14. The access request given from the interface bus 10 is transmitted to a peripheral bus interface controller (PBIC) 15, and is transmitted therefrom to one peripheral circuit 24 or more through a peripheral bus 23 and to the internal memory controller 14, and furthermore, a secondary cache memory controller 21 through an interface bus 16 to be a third bus.

The internal memory controller 14 carries out an access interface control for the internal memory 20. The secondary cache memory controller 21 controls the internal memory 20 as a secondary cache memory for the cache memory 6.

The peripheral bus interface controller 15 has information about address mapping for the peripheral circuit 24 and the internal memory 20, and outputs an access request to the peripheral bus 23 if an access request given from the interface bus 10 is to be sent to the peripheral circuit, and outputs the access request to the interface bus 16 if the same access request is to be sent to the internal memory 20. In some cases, the peripheral circuit 24 includes a bus master module of a DMAC (direct memory access controller) or a bus slave module of a timer counter or a serial interface.

The internal memory controller 14 mediates the access request given from the interface bus 13 and the access request given from the interface bus 16, and outputs, to a bus 17, an access control signal to be sent to the internal memory 20. The access request is given from the interface bus 13 when the internal memory 20 is to be accessed as the non-cacheable area of the primary cache memory 6. On the other hand, the access request is sent through 10 and 16 when the internal memory 20 is to be accessed as the cacheable area of the primary cache memory 6. Whether the access request to be given to the internal memory 20 is the cacheable area of the primary cache memory 6 is decided by the primary cache memory controller 5 based on an access address. The designation of a cacheable area (cacheable) and a non-cacheable area (non-cacheable) for the internal memory 20 is determined by the designation of a cacheable area or a non-cacheable area for a memory space to which the internal memory 20 is mapped. The designation is carried out in the operation mode of a microcomputer 1 or by setting a control register (not shown), for example.

Moreover, the secondary cache memory controller 21 compares the address tag of an access address included in an access request given from the interface bus 16 with a cache tag in the secondary cache memory controller 21 in response to the same access request, and outputs, to a bus 18, the access control signal of a cache entry manipulation for manipulating the internal memory 20 as a cache memory if a cache hit is obtained.

Either the access control signal sent from the bus 17 or the access control signal sent from the bus 18 is transmitted to the internal memory 20 through a selector 19. The internal memory 20 is accessed in response to the access control signal thus transmitted. If an access operation instruction for the internal memory 20 is a read access, the internal memory 20 outputs read data to a bus 26 and transmits the same data to the internal memory controller 14 or the secondary cache memory controller 21. In case of a write operation, write data are given from the internal memory controller 14 or the secondary cache memory controller 21 to the memory 20 through the bus 26. A write instruction given from the secondary cache memory controller 21 to the memory 20 through the bus 26 is given in a cache fill operation caused by a read error or a cache fill operation caused by a write error in the secondary cache memory.

The selection of the selector 19 is determined in accordance with the set value of a mode control register 22. Moreover, the ON/OFF operations of the internal memory controller 14 and the secondary cache memory controller 21 are also determined in accordance with the set value of the register 22. In the case in which the operation of the internal memory controller 14 is selected (valid), the secondary cache memory controller 21 is not operated but the output of the internal memory controller 14 is selected by the selector 19. To the contrary, if the secondary cache memory controller 21 is valid, the internal memory controller 14 is not operated but the output of the secondary cache memory controller 21 is selected by the selector 19.

The internal memory controller 14 outputs, to the interface bus 13 or 16, a result of a response to the access request. Moreover, the secondary cache memory controller 21 outputs, to the interface bus 16, a result of a response to the access request.

When a flush for the primary cache memory 6 is carried out, the primary cache memory controller 5 outputs a cache flush request signal 30 to the secondary cache memory controller 21. The signal 30 is generated by the indication of a program during the execution of a flush manipulation instruction for the primary cache memory 6 by CPU 3. The flush request signal 30 is supplied as a flush request signal 31 to the secondary cache memory controller 21 through the peripheral bus interface controller 15. The secondary cache memory controller 21 invalidates the valid bits of all cache entries of a cache tag retained in the secondary cache memory controller 21 and clears a cache entry in the internal memory 20 in response to the signal 31.

Figure 2:
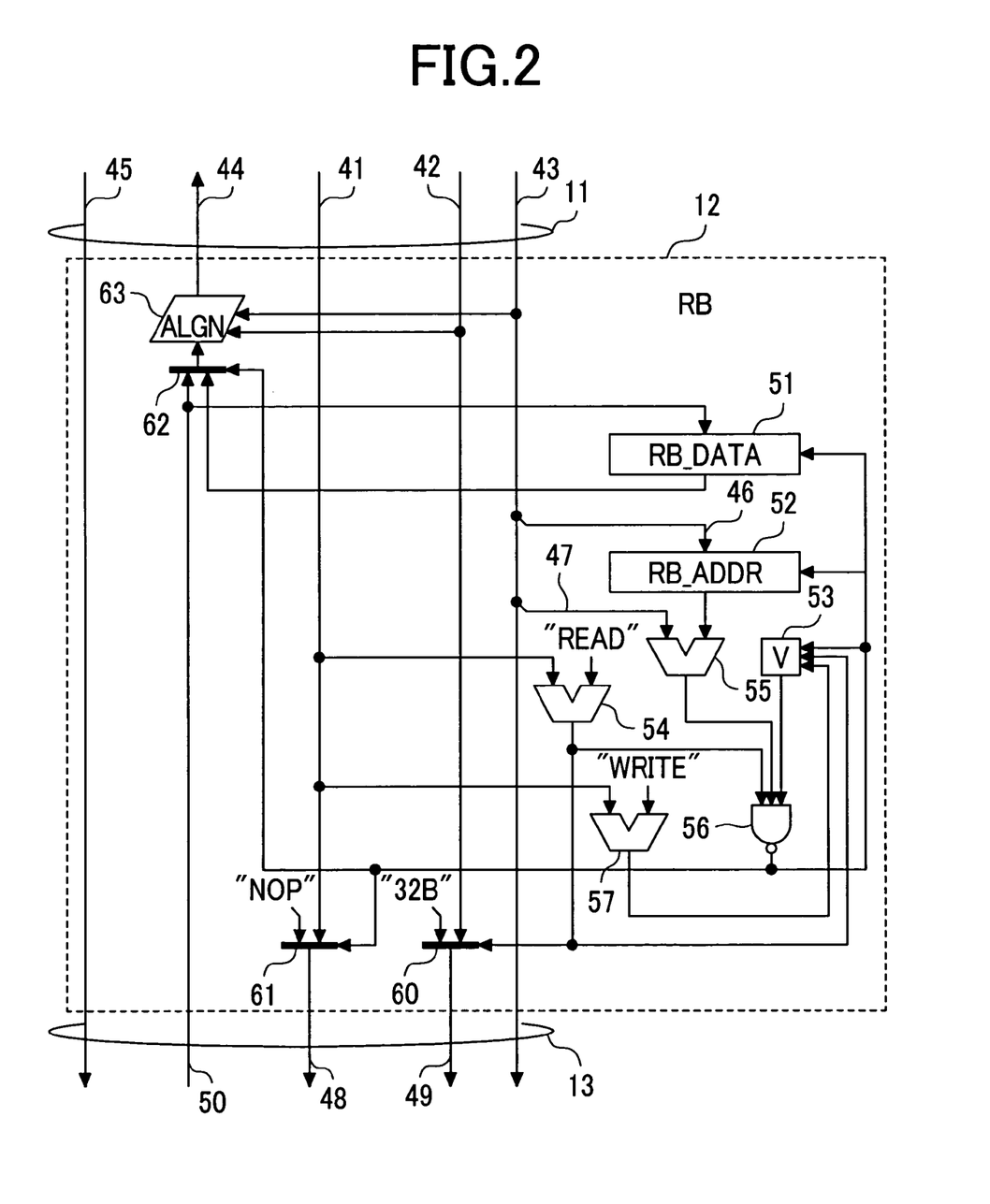
FIG. 2 is a logical circuit diagram illustrating the details of a read buffer.

FIG. 2 illustrates the details of the read buffer 12. 41 to 45 denote portions obtained by dividing the interface bus 11. 41 denotes a type of an access request which indicates a read request, a write request or no access request (NOP). 42 denotes a data width of the access request which has 1 byte, 2 bytes, 4 bytes, 8 bytes and 32 bytes. 43 denotes an address of the access request which has a 22-bit width. 44 denotes a signal which serves to return read data when the access request is the read request and has a 64-bit width (corresponding to 8 bytes). 45 denotes a signal for transferring write data when the access request is the write. 46 and 47 denote an address signal corresponding to higher 17 bits of the address 43.

Moreover, the combination of 48 to 50 and 43 and 45 correspond to the bus 13. 48 is equivalent to 41, 49 is equivalent to 42, and 50 is equivalent to 44.

51 denotes a data register having a 256-bit width which holds last access data. 52 denotes an address register having a 17-bit width which holds higher 17 bits of a last access address. 53 denotes a 1-bit register which holds "1" when contents held in the register 51 and the register 52 are valid and holds "0" when they are invalid.

54 denotes a comparator which outputs "1" when the signal 41 is the read request. 55 denotes a comparator which outputs "1" when the contents held in the signal 47 and the address register 52 are coincident with each other. 56 denotes a NAND gate. The output of the NAND gate 56 is "0" when "the signal 41 is the read request, the contents held in the signal 47 and the register 52 are coincident with each other, and the register 53 is "1" indicative of validation". More specifically, when the output of the NAND gate 56 is "0", the hit of the read buffer 12 is indicated. 57 denotes a comparator which outputs "1" when the signal 41 is the write request.

When the output of the comparator 54 is "1", that is, the signal 41 is the read request, the output of the signal 49 is replaced with a 32-byte access request by a selector 60. When the output of the comparator 54 is "0", that is, the signal 41 is not the read request, the input of the signal 42 is exactly output to the signal 49.

When the output of the NAND gate 56 is "0", that is, the read buffer 12 is hit, the output of the signal 48 is replaced with NOP by a selector 61. When the output of the NAND gate 56 is "1", the output of the signal 41 is exactly sent to the signal 48.

When the output of the NAND gate 56 is "0", moreover, the output of the register 51 is input to an aligner (ALGN) 63 by a selector 62. When the output of the NAND gate 56 is "1", the input of the signal 50 is sent to the aligner 63. The aligner 63 rearranges the bit positions of input data and outputs them to the signal 44 in accordance with the contents of the signals 42 and 43.

When the output of the NAND gate 56 is "1", the registers 51 and 52 fetch the contents of the signals 50 and 46 respectively. The contents held in 53 are changed to "0" when the output of the comparator 57 is "1". The reason is that data and an address are input to the registers 51 and 52 in a write in the same manner as the case of a read buffer error. When the output of the comparator 54 is "1" and the output of the NAND gate 56 is "1", a change to "1" is carried out. The reason is that the data of the register 51 are to be available in accordance with the result of the address comparison of the register 52 in a next read operation.

Figure 3:
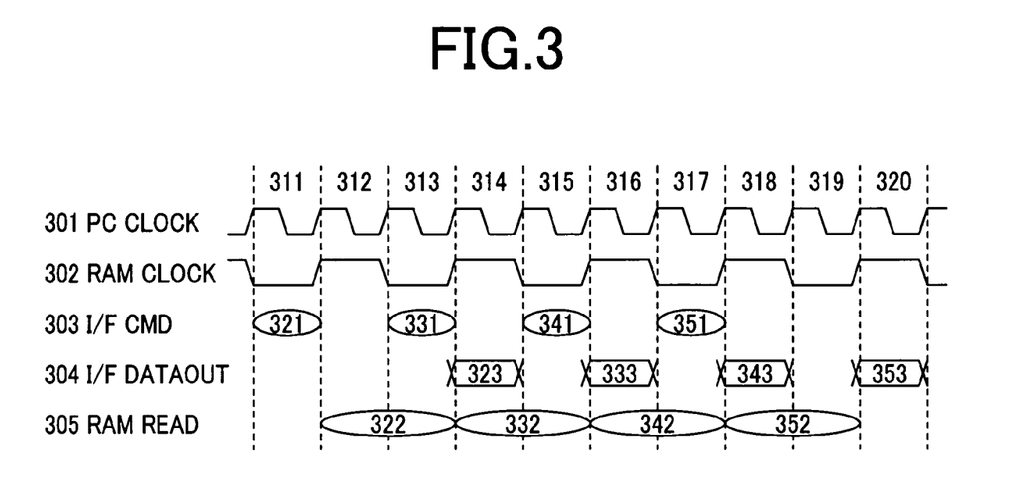
FIG. 3 is a timing chart showing, as a comparative example, the case in which data are read from an interface bus for a sequential access when the read buffer is not utilized or the read buffer is not provided.
Figure 4:
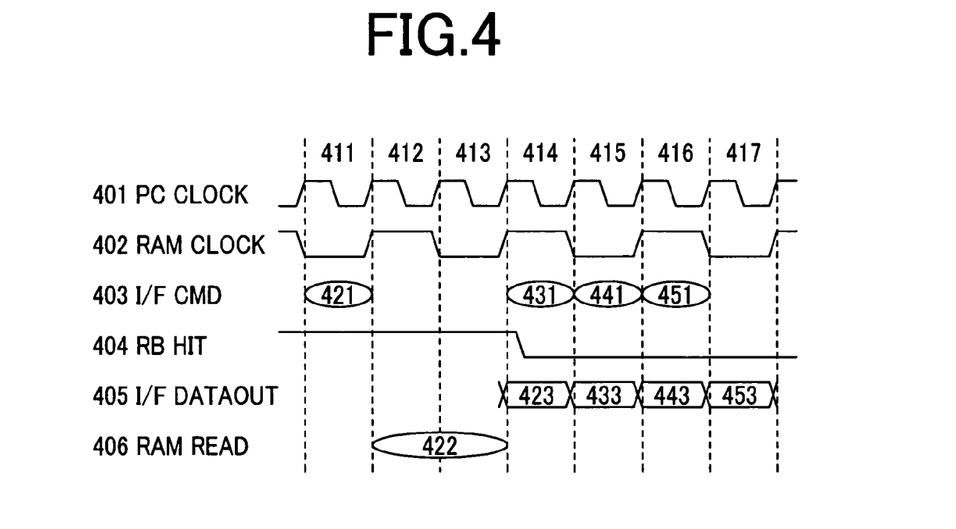
FIG. 4 is a timing chart showing an operation for reading data from the interface bus for a sequential access by utilizing the read buffer.

FIG. 3 is a timing chart according to a comparative example, in which data are read from the interface bus 11 for a sequential access when the read buffer 12 is not utilized or the read buffer 12 is not provided. FIG. 4 is a timing chart showing the case in which the read buffer 12 is utilized to read the data from the interface bus 11 for a sequential access.

Herein, the read buffer 12 and the processor core 2 are operated at the same frequency, the ratio of the operating frequency of the read buffer 12 to the operating frequency of the internal memory 20 is assumed to be 2:1, and there is continuously carried out a read in which the sequential access from the processor core 2 is performed every 8 bytes (64 bits).

In FIG. 3, 301 denotes a clock signal of the processor core 2, 302 denotes a clock signal of the internal memory 20, 303 denotes an access request based on the signals 41 and 42 sent from the processor core 2, 304 denotes a data output to be sent from the internal memory 20 to the bus 44, and 305 denotes the operations of the internal memory 20 and the internal memory controller 14. Moreover, 311 to 320 denote a clock cycle of the processor core 2.

321 denotes an 8-byte read request given from the processor core 2, and the internal memory controller 14 carries out a read operation over the request as shown in 322 for a period of 312 to 313, and outputs read data 323 for a period of 314. 331 to 333, 341 to 343, and 351 to 353 also carry out the same operations as 321 to 323, and the 8-byte read requests of 321, 331, 341 and 351 have continuous addresses. In this case, an operating period of 10 cycles is required at the clock of the processor core 2 from the first read request 321 to the final data output 353.

In the timing chart of FIG. 4 showing the case in which the read buffer 12 is provided, 401, 402 and 403 are the same as 301, 302 and 303. 404 denotes a hit signal of the read buffer which corresponds to the output of the NAND gate 56 in FIG. 2. 405 denotes a data output from the read buffer 12 to the bus 44, and 406 denotes the operations of the internal memory 20 and the internal memory controller 14. Moreover, 411 to 417 denote a clock cycle of the processor core 2.

421 denotes an 8-byte read request given from the processor core 2. 422 denotes the operation of an internal memory corresponding thereto. This operation carries out the replacement of a request in the read buffer 12 and is not the 8-byte read but a 32-byte read. 423 denotes a data output to be sent to the processor core 2 which is carried out for a period of 414 after the end of the operation of 422. While a second 8-byte read request 431 is issued from the processor core 2 for the period of 414, moreover, the 32-byte read is carried out in the first read request 421. Therefore, the read buffer 12 is hit so that the signal of 404 (the output signal of the NAND gate 56) is changed from "1" to "0". A data output 433 for 431 is carried out for a period of 415. The read buffer 12 is also hit for third and fourth 8-byte read requests 441 and 451. Consequently, data outputs 443 and 453 are carried out for periods 416 and 417, respectively.

Figure 5:
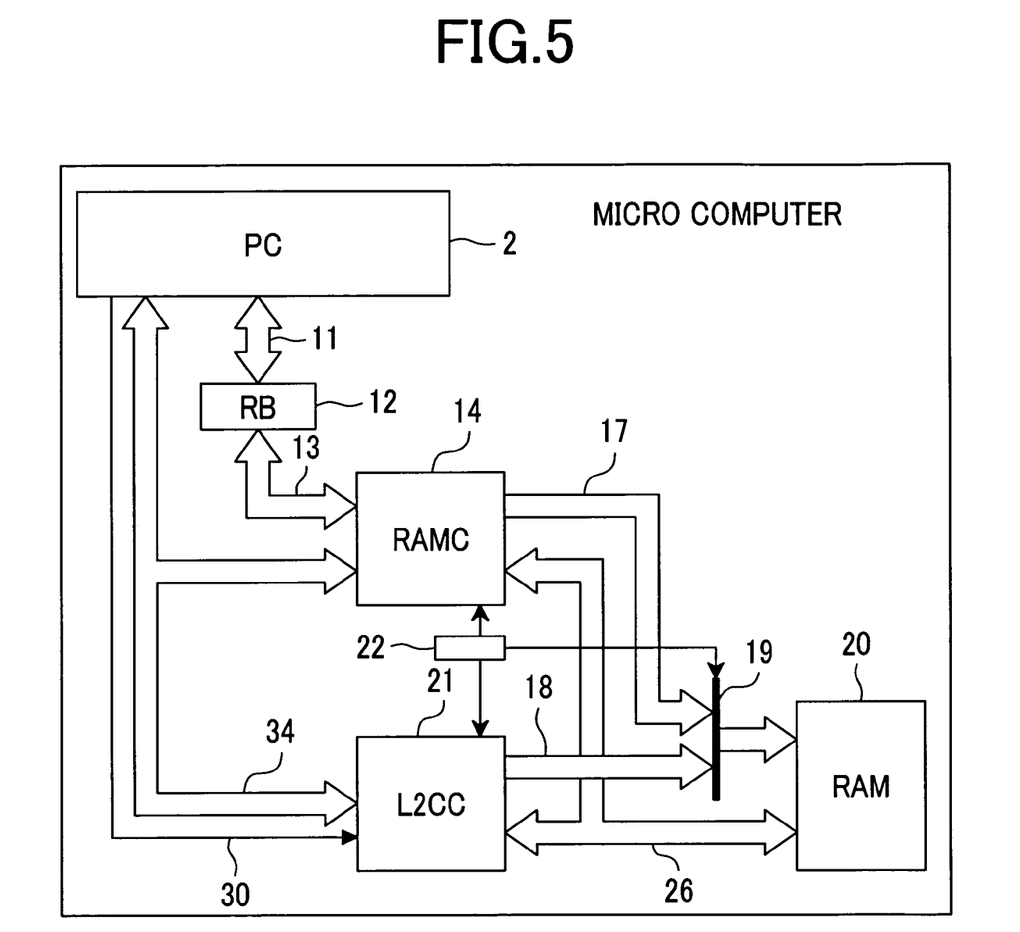
FIG. 5 is a block diagram showing another example of the microcomputer.

FIG. 5 shows another example of the microcomputer. In a microcomputer shown in FIG. 5, the peripheral bus interface controller 15 shown in FIG. 1 is omitted, and the processor core 2 is directly connected to the internal memory controller 14 and the secondary cache memory controller 21 through an interface bus 34 to be a third bus. Moreover, the signal 30 indicative of a flush request output from the primary cache memory controller 5 to the secondary cache memory controller 21 is exactly supplied to the secondary cache memory controller 21. The same structures as those in FIG. 1 have the same reference numerals and detailed description thereof will be omitted.

The structures of FIGS. 1 and 5 are compared with each other. In the example shown in FIG. 1, the peripheral bus interface controller 15 decides an access request destination from an address for an access request given from the primary cache memory controller 5 and outputs an access control signal required for the access request destination thus decided. Alternatively, a data transfer request destination is decided from an address in the same manner for a data transfer request given from the peripheral circuit 24 constituting the bus master module such as a DMAC, and an access control signal required for the access request destination thus decided is output. Accordingly, the interface buses 10 and 16 are not dedicated buses for a specific memory and a peripheral circuit. On the other hand, the interface buses 11 and 13 are dedicated sequential access buses. By employing a structure in which an access path for accessing the same internal memory 20 via the memory controller 14 is divided through a sequential access and a random access, accordingly, it is possible to dedicate a path for a sequential access. Consequently, it is preferable that a specific interface protocol should be implemented, and a general purpose utilization with other memories or peripheral circuits does not need to be considered. Correspondingly, it is advantageous to an increase in the speed of an interface operation for the sequential access. In the structure shown in FIG. 5, the peripheral bus interface controller 15 is not provided on the interface bus 34 but a connection to both the memory controller 14 and the secondary cache memory controller 21 is carried out. In this sense, the driving load of the bus 34 is comparatively increased in respect of the input capacities of both of the circuits. Also in the case in which the peripheral bus interface controller 15 is not provided, it is advantageous that the bus for the sequential access is dedicated by the buses 11 and 13 in order to increase the speed of the sequential access operation in that respect.

In the structure shown in FIG. 1, moreover, in the case in which the internal memory 20 is caused to be valid by setting the register 22, a program which is being executed in the processor core 2 can also accept an internal memory access request from the peripheral bus (processor bus) 23 side through the interface bus 16 for a random access while accessing the internal memory 20 through the interface buses 11 and 13 for a sequential access.

According to the microcomputer described above, a normal memory mode (an operation mode for causing the internal memory controller 14 to be valid) is used in a program in which the sequential access to the internal memory 20 is present, for example, image data or music data. In particular, it is possible to expect an enhancement in the performance of the read buffer 12 for a sequential access. Moreover, the read buffer 12 has a small amount of circuits and an operation can be expected at a higher frequency than that in the internal memory 20. As described based on FIG. 1, in the case in which the read buffer 12 and the processor core 2 are operated at the same frequency and the ratio of the operating frequency of the read buffer 12 to the operating frequency of the internal memory 20 is 2:1, 10 cycles are required at the clock of the processor core 2 from a first read request to a final data output if the read buffer 12 is not provided, while a reduction to 7 cycles is carried out so that a performance can be enhanced if the read buffer 12 is provided. Moreover, the number of accesses of the internal memory 20 is also decreased from four to one.

In the sequential access, the cache operation of the primary cache memory 6 is not carried out and cache entry data retained in the primary cache memory 6 can be prevented from being undesirably rewritten by sequential access data such as image data having a low possibility of a re-access.

Moreover, it is possible to switch the control of the internal memory to a normal memory mode and a secondary cache mode (an operation mode for causing the secondary cache memory controller 21 to be valid). Consequently, it is possible to practically use the internal memory 20 in an optimum configuration corresponding to the contents of the processing of a program, thereby contributing to an enhancement in a data processing performance. In a program having a large number of random accesses to the memory 20, it is possible to decrease the penalty of a primary cache error by practically using the secondary cache mode, resulting in a contribution to the enhancement in the data processing performance.

While the invention has specifically been described above, the invention is not restricted thereto but various changes can be made without departing from a scope thereof. For example, the processor core may be provided with a memory management unit for converting a logical address to a physical address. The primary cache memory may be provided separately for data and an instruction, respectively. In that case, a data cache memory may be mainly connected to the read buffer restrictively. Moreover, a flush request output from the primary cache memory controller 5 to the secondary cache memory controller 21 is not restricted to an indication by an individual signal but an indication may be given in a command through the interface bus. While an external input/output circuit to be interfaced with the outside of the microcomputer is not shown in the examples of FIGS. 1 and 5, it is apparent that the external input/output circuit is actually provided. The invention can be widely applied to a microcomputer, a microprocessor, and furthermore, an electronic circuit utilizing them.

What is claimed is:

1. A semiconductor data processor comprising:
a first memory constituting a cache memory;
a second memory which can be used to provide a cacheable area or a non-cacheable area for the first memory; and
a read buffer which performs an operation to output data corresponding to a read access when the second memory is read accessed for the non-cacheable area,
wherein the read buffer temporarily holds predetermined access data and address data when the second memory is accessed for the non-cacheable area,
wherein the read buffer is connected to a first bus upstream therefrom in a transmission path of a read request and is connected to a second bus downstream therefrom in the transmission path of the read request, and
wherein the second bus transmits data in a first number of parallel access data bits which is larger than a second number of parallel access data bits on the first bus.

2. The semiconductor data processor according to claim 1, wherein the read buffer includes a data register to hold read data to be transmitted through the first bus, an address register to hold an address of the read data, and a control circuit to control the first bus to output the read data of the data register for a read request of an address which is coincident with the address of the read data held in the address register.

3. A semiconductor data processor comprising:
a first memory constituting a cache memory;
a second memory which can be used as a cacheable area or a non-cacheable area by the first memory;
a read buffer which performs an operation to output data corresponding to a read access when the second memory is read accessed as the non-cacheable area;
a first bus connected between the first memory and the read buffer;
a second bus connected between the read buffer and the second memory; and
a third bus connected between the first memory to the second memory, in a path different from a path formed by the first and second buses, to access the second memory for the cacheable area,
wherein the read buffer temporarily holds predetermined access data and address data when the second memory is accessed as the non-cacheable area, and
wherein a first bus and a second bus which are dedicated sequential access buses for the read buffer.

4. The semiconductor data processor according to claim 3, further comprising a peripheral bus interface controller connected to the third bus.

5. The semiconductor data processor according to claim 3, further comprising an internal memory controller connected to the second bus and the third bus and serving to carry out an access interface control for the second memory.

6. The semiconductor data processor according to claim 5, wherein the third bus is provided with a secondary cache memory controller which controls the second memory as a secondary cache memory for the first memory.

7. The semiconductor data processor according to claim 6, wherein the secondary cache memory controller invalidates the second memory in response to a signal indicative of a cache invalidation of the first memory.

8. The semiconductor data processor according to claim 6, further comprising a control register which sets the internal memory controller and the secondary cache memory controller to operate exclusively of each other.

9. A semiconductor data processor comprising:
a first memory constituting a cache memory;
a second memory which can be used to provide a secondary cache memory or memory which is not cache memory for the first memory;
a designator which selectively designates an area of the second memory as secondary cache memory or memory which is not cache memory;
a secondary cache memory controller which performs an access interface control to the second memory area as secondary cache memory;
an internal memory controller which performs access interface control to the second memory area as memory which is not cache memory; and
a read buffer which performs an operation to output data, read from the second memory area via the internal memory controller, when the second memory area is read accessed as memory which is not cache memory by the internal memory controller.

10. The semiconductor data processor according to claim 9, wherein the read buffer newly holds data and address information corresponding to an access if it does not retain data corresponding to the access when the second memory area is accessed as memory which is not cache memory by the internal memory controller.

11. The semiconductor data processor according to claim 10, wherein the read buffer is connected to a first bus upstream therefrom in a transmission path of a read request and is connected to a second bus, having a greater bus width than a width of the first bus, downstream therefrom in the transmission path of the read request.

* * * * *